L. E. PRESCOTT.
RING PACKING.
APPLICATION FILED MAR. 10, 1917.
1,294,829.
Patented Feb. 18, 1919.
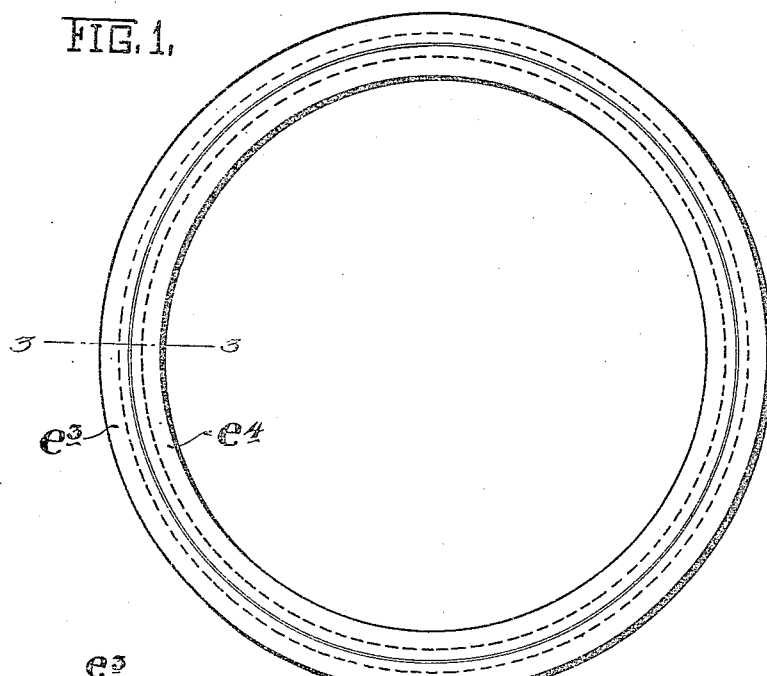
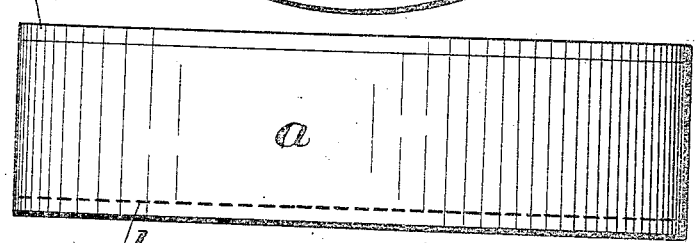
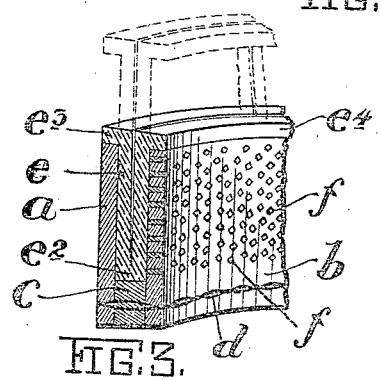
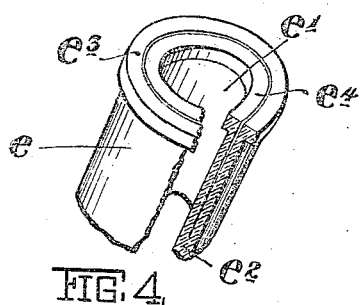
INVENTOR,
Lewis E. Prescott,
BY
Allen + Daggett,
ATTORNEYS

UNITED STATES PATENT OFFICE.

LEWIS E. PRESCOTT, OF BOSTON, MASSACHUSETTS.

RING-PACKING.

1,294,829.　　　　　Specification of Letters Patent.　　Patented Feb. 18, 1919.

Application filed March 10, 1917. Serial No. 153,973.

*To all whom it may concern:*

Be it known that I, LEWIS E. PRESCOTT, a citizen of the United States, residing at Boston, in the county of Suffolk and State of Massachusetts, have invented a certain new and useful Improvement in Ring-Packings, of which the following is a specification, reference being had to the accompanying drawings.

The object of this invention is to provide a reasonably cheap and serviceable ring packing which is specially valuable for use with the plungers of hydraulic elevators; said packing consisting essentially of a novel combination and arrangement of leather and rubber ring section in which special provision is made for the flexibility and wear of said packing.

My said invention is illustrated in and by the annexed drawings, Figure 1 being an end, or edge, view of a packing of my newly improved construction and Fig. 2 is a circumferential face view of the same. Fig. 3 is a transverse sectional view taken on the line 3—3 of Fig. 1 and Fig. 4 is a perspective view (partly broken away) of the rubber annulus $e$.

Referring to these drawings, the letters $a$ and $b$ indicate respectively outer and inner ring members made of leather and connected at their lower edge portions by an interposed annulus $c$ of leather which is stitched to the said ring members as seen at $d$, the construction thus far described providing an annular space between the major part of members $a$ and $b$ in which space is inserted a rubber member which is best illustrated in Figs. 3 and 4 of the drawings; said member being formed of a single piece of more or less flexible rubber comprising an inner shell $e'$ and outer shell $e$ that are connected integrally at $e^2$, the upper (free) ends of the walls $e$ and $e'$ being formed, respectively, with annular ribs $e^3$ and $e^4$.

In the manufacture of my improved packing the leather ring members $a$ and $b$ and the interposed annulus $c$ are assembled, and united by stitching at the point $d$, and the rubber packing is then forced into the annular space between said ring members, until the ribs $e^3$—$e^4$ abut the upper edges of said members (see Fig. 3).

The packing thus constructed provides, in the leather ring members $a$ and $b$ tough and serviceable wearing surfaces and the interposed rubber member provides a desirable degree of resiliency in the complete packing.

While I prefer to form the members $a$ and $b$ as unbroken rings, the interposed rubber member may, if desirable or necessary, be cut apart longitudinally at one side, so that it may be wrapped around the plunger and then inserted in the space between the rings $a$—$b$ thus avoiding the delay and expense otherwise caused by having to remove the plunger from the packing in order to repair the packing.

I stud the inner packing ring $b$ with wooden pegs $f$ or the like, in order to increase the wearing quality of said packing.

Having thus described my invention, I claim as new and wish to secure by Letters Patent:—

The improved packing consisting of an outer ring, an inner ring or leather, means for integrally uniting said rings, and an annulus of rubber inserted between said rings; the inner ring member being studded with relatively harder material than leather.

LEWIS E. PRESCOTT.

Copies of this patent may be obtained for five cents each, by addressing the "Commissioner of Patents, Washington, D. C."